United States Patent [19]

Graboski

[11] 4,169,910

[45] Oct. 2, 1979

[54] MULTILAYER FILM INCLUDING POLYOLEFIN LAYERS AND A POLYBUTYLENE LAYER USEFUL FOR THE PRODUCTION OF BAGS

[75] Inventor: James J. Graboski, Lisle, Ill.

[73] Assignee: Union Carbide Corporation, New York, N.Y.

[21] Appl. No.: 919,852

[22] Filed: Jun. 28, 1978

[51] Int. Cl.$^2$ .................... B32B 1/02; B32B 27/08; B32B 27/32; B65D 29/06

[52] U.S. Cl. .................... 428/35; 156/243; 156/251; 156/290; 156/306; 229/53; 428/516; 264/71

[58] Field of Search ............ 428/516, 35; 156/244, 156/251, 290, 306; 229/53

[56] References Cited

U.S. PATENT DOCUMENTS

| | | | |
|---|---|---|---|
| 3,524,795 | 8/1970 | Peterson | 428/516 |
| 3,997,383 | 12/1976 | Bieler et al. | 428/516 |
| 4,046,945 | 9/1977 | Boxmann | 428/516 |

*Primary Examiner*—J. C. Cannon
*Attorney, Agent, or Firm*—David Fink

[57] ABSTRACT

A multilayer film suitable for use in fabricating a trash bag, includes a first outer layer comprising a first heat sealable polyolefin, a second outer layer comprising a second heat sealable polyolefin, and a core layer comprising a blend of a polybutylene homopolymer, and a polypropylene homopolymer or copolymer.

30 Claims, No Drawings

MULTILAYER FILM INCLUDING POLYOLEFIN LAYERS AND A POLYBUTYLENE LAYER USEFUL FOR THE PRODUCTION OF BAGS

The present invention relates to a multilayer film, and more particularly to a multilayer plastic film suitable for use in fabricating a trash bag.

Generally, there are a large number of prior art plastic films including multilayer films suitable for various general and specific applications.

A plastic film suitable for use in fabricating a trash bag must exhibit strong physical properties in order to resist internal and external stresses on the bag. Such a bag could also be suitable for use as a container for shipping goods. In addition to resisting stresses, it is highly advantageous if the plastic film is easily heat sealable in order to simplify the manufacturing operations for producing the bags. The heat sealed seams must be strong and be capable of resisting stresses tending to break the seams.

The economics in producing the plastic film must be favorable and allow for high production speeds. Generally, it has been found in the prior art that low density polyolefin monolayer films adequately satisfy many of the requirements for a film for use in forming trash bags. It has been found that the use of low density polyolefin monolayer film for large refuse disposer bags often requires an increase in film gauge in order to maintain satisfactory physical properties. The increased film gauge often results in increased production costs and is therefore considered undesirable for certain applications.

The instant invention overcomes the prior art problems and provides a film which can be produced economically at relatively high speeds and can be heat sealed to define strong reliable bags.

In accordance with the present invention, there is provided a multilayer film suitable for use in fabricating a trash bag, including a first outer layer comprising a first heat sealable polyolefin, a second outer layer comprising a second heat sealable polyolefin, and a core layer comprising a blend of a polybutylene homopolymer, and a polypropylene homopolymer or copolymer.

The invention further comprises a bag fabricated from the multilayer film.

The present invention also relates to a method of producing the aforementioned multilayer film, comprising the step of coextruding said layers through a single die gap.

It has been determined experimentally that the extrusion of a single layer of the blend of the polybutylene homopolymer and polypropylene polymer, especially for low melt flow values, does not result in an acceptable film for a film having a thickness of about 1.5 mils or less.

Thus, a single layer film of the blend or a two layer thin film having a one layer of the blend is unacceptable. For these films, the thickness is not uniform and many holes in the film are formed. The appearance of a hole interferes with the formation of a "bubble" in carrying out the blown film extrusion.

The suitable heat sealable polyolefins include copolymers of ethylene vinyl acetate and ethylene ethyl acrylates each having comonomer contents of from about 1% to 30% by weight and a melt flow of from about 0.3 to about 10.0 decigrams per minute. Suitable polyolefins further include polyethylene having a density of from about 0.916 to about 0.962 grams per cubic centimeter and having a melt flow of from about 0.1 to about 10 decigrams per minute.

Preferably, the ethylene vinyl acetate copolymer and ethylene ethyl acrylate copolymer each has a comonomer content of from about 1% to about 20% by weight and a melt flow of from about 0.3 to about 5 decigrams per minute.

Preferably, the polyethylene has a density of from about 0.916 to about 0.930 gram per cubic centimeter and a melt flow of from about 0.1 to about 6 decigrams per minute.

For the core layer, polypropylene polymer having a density of from about 0.89 to about 0.91 gram per cubic centimeter and having a melt flow of from about 0.5 to about 15 decigrams per minute is preferable.

Generally, for the core layer, the polybutylene homopolymer has a density of from about 0.90 to about 0.92 gram per cubic centimeter and a melt flow of from about 0.4 to about 10 decigrams per minute.

Preferably, all of the polymers used in the invention are film grade.

Generally, the overall thickness of the film of the invention can be from about 0.5 to about 10 mils. Preferably, the overall thickness is from about 1 to about 3 mils. The core layer is from about 10% to about 90% of the overall thickness. Most of the strength of the film is derived from the core layer.

Preferably, the blend of the polybutylene homopolymer and the polypropylene polymer is in equal amounts. The blend can range from about 10% to about 90% by weight of one polymer with the balance being the other, preferably 2:1 to 1:2.

In general, various conventional additives such as slip agents, antiblocking agents, and pigments can be incorporated in the film of the invention in accordance with the conventional practice.

The properties of the polymers described herein as well as the test results reported herein have been measured in accordance with the following test methods:

Density: ASTM D-1505
Melt Flow: ASTM D-1238
Polypropylene Polymer—Condition L
Polybutylene Homopolymer—Condition E
Ethylene Vinyl Acetate—Condition E
Polyethylene Polymer—Condition E
Puncture Toughness: Generally this test includes driving a ½ inch round probe at the rate of 20 inches per minute against a sample of film. The load at puncture is measured along with the area under the load-elongation curve (energy).
Tensile Strength: ASTM D-882—Method A
Tensile Energy: Energy of film to fracture for ASTM D-882—Method A
Dart Drop: ASTM D-1709 (50% failure)
Heat Seal Strength Test: Two one-inch wide strips of film are sealed to each other at a central portion and subjected to ASTM D-882 until delamination or a break occurs.
Elmendorf Tear: ASTM D-1922

All percentages and parts given herein are by weight unless otherwise indicated.

The blowup ratio as used herein is the ratio of the flat width of the blown tube of film to the exit diameter of the die.

The drawdown ratio as used herein is the ratio of the exterior gap of the die and the thickness of the drawn film.

Illustrative, non-limiting examples of the practice of the invention are set out below. Numerous other examples can readily be evolved in the light of the guiding principles and teachings contained herein. The examples given herein are intended to illustrate the invention and not in any sense to limit the manner in which the invention can be practiced.

Table 1 shows the polymers used in the examples herein.

Table 1

| Polymer | Melt Flow dg/min. | Description | Commercial Identification and Source |
|---------|-------------------|-------------|--------------------------------------|
| P-E A | 2.0 | Polyethylene density: 0.919 g/cc | DYNH-9 Union Carbide Corporation |
| P-E B | 0.1 | Polyethylene density: 0.917 g/cc | |
| P-E C | 0.3 | Polyethylene density: 0.953 g/cc | DGDA 6093 Union Carbide Corp. |
| P-P A | 0.6 | Polypropylene Homopolymer density: 0.905 g/cc | Shell 5220, Shell Chemical Company |
| P-P B | 3.0 | Polypropylene Copolymer density: 0.900 g/cc | Rexene PP 44J3, Rexene Polymers Co. |
| P-P C | 4.0 | Polypropylene Copolymer density: 0.900 g/cc | Hercules Profax 8531, Hercules Chem Co. |
| P-P D | 7.0 | Polypropylene Homopolymer density: 0.905 g/cc | Rexene PP 4451, Rexene Polymers Co. |
| P-P E | 12.0 | Polypropylene Copolymer density: .899 g/cc | PP 9818, Diamond Shamrock Chem. Co. |
| P-B A | 1.0 | Polybutylene Homopolymer density: 0.910 g/cc | Shell 1600, Shell Chemical Co. |
| P-B B | 2.1 | Polybutylene density: 0.910 g/cc | Shell 1200, Shell Chemical Co. |
| EVA A | 1.0 | Ethylene Vinyl Acetate 4% vinyl acetate | DQDA-1824, Union Carbide Corp. |

EXAMPLES 1 AND 2

For Example 1, a multilayer film according to the instant invention was produced in accordance with conventional blown film coextrusion methods using a three layer spiral-channel die having a diameter of 12 inches to form a tube of the film. An EGAN die was used. The exterior die gap was 30 mils. The blowup ratio was about 3:1 and the drawdown ratio was about 20:1.

Three separate extruders were used. Each extruder was supplied with the polymer for forming one of the layers for the film. Each extruder was arranged to feed a separate channel of the three layer die. The multilayer film was extruded through the single die gap. While the multilayer film had only three layers, it is possible to have additional layers by using additional extruders and a multilayer die having a number of channels corresponding to the number of extruders used.

Each of the outer layers was polymer P-E A and the core layer was an equal blend of polymers P-P A and P-B B.

The overall thickness of the resulting film was about 1.5 mils and the core layer thickness was about 45% of the total film thickness. The inner and outer layers had about the same thickness.

Example 2 was a monolayer film of polymer P-E A also produced by a similar blown film process and subjected to similar blowup and drawdown ratios.

Table 2 compares the physical properties of the films of Examples 1 and 2 to each other and includes typical values for a typical prior art film having a thickness of about 1.5 mil.

Table 2

| Physical Property | (Invention) Example 1 | (Monolayer) Example 2 | Typical Prior Art Film |
|-------------------|----------------------|----------------------|------------------------|
| Puncture Toughness load (lbs.) | 9.1 | 5.5 | 6.3 |
| Puncture Toughness energy (inch-lbs.) | 20.0 | 4.5 | 4.8 |
| Tensile Strength, MD (lbs./in$^2$) | 5700 | 2400 | 3100 |
| TD | 4700 | 2200 | 1800 |
| Tensile Energy MD (in.-lbs.) | 46 | 21 | 20 |
| TD | 40 | 29 | 27 |
| Dart Drop (g.) | 132 | 85 | 90 |

From Table 2, it is evident that the film of the instant invention, Example 1, possesses superior physical properties with respect to the monolayer film of Example 2 as well as the typical prior art film.

EXAMPLES 3, 4 AND 5

Examples 3, 4, and 5 were carried out in an endeavor to compare the physical properties of films of the instant invention for different polypropylene polymers. Films were produced for the Examples 3, 4, and 5 in accordance with the process of Example 1 and with the same outer layers and the same ratio for the blend except that an Egan die having a diameter of 8 inches and an exterior gap of 35 mils was used. The polypropylene polymer for each of the examples 3, 4, and 5 is shown in Table 3 along with the measured physical properties. Each of the films for the Examples 3, 4 and 5 had an overall thickness of about 1.5 mil and the thickness of each layer was about equal to each other. For each film, the blowup ratio was about 4:1 and the drawdown ratio was about 35:1.5.

Table 3

| Physical Properties | Example 3 | Example 4 | Example 5 |
|---------------------|-----------|-----------|-----------|
| Polypropylene polymer in core layer | P-P A | P-P B | P-P C |
| Puncture Toughness load (lbs.) | 9.7 | 4.9 | 4.7 |
| Puncture Toughness energy (in.-lbs.) | 13.3 | 5.2 | 4.8 |
| Tensile Strength MD (lbs./in.$^2$) | 4000 | 4100 | 3700 |
| TD | 3800 | 3000 | 3200 |

Some variation in the properties of the film of Example 3 as compared to the film of Example 1 is evident perhaps due to the different blowup and drawdown ratios.

From Table 3, it can be seen that the film of Example 3 had the best physical properties. From Table 1, it can be seen that polymer P-P A has a lower melt flow as compared to polymers P-P B and P-P C and is preferable.

EXAMPLES 6 AND 7

Examples 6 and 7 were carried out in order to compare the physical properties of films for different core layer thicknesses. The films for the Examples 6 and 7 were produced in accordance with the process used for producing the films of the Examples 3 to 5 and each of these films included layers having the same polymer as in the film of the Example 1. Table 4 shows a comparison between the films of the Examples 6 and 7.

Table 4

| Physical Properties | Example 6 | Example 7 |
|---|---|---|
| Core thickness as % of overall thickness | 45% | 33% |
| Puncture Toughness load (lbs.) | 9.0 | 9.7 |
| Puncture Toughness energy (in./lbs.) | 20.0 | 13.3 |
| Tensile Strength (lbs./in.$^2$) MD | 5700 | 4000 |
| TD | 4700 | 3800 |

Table 4 shows that the core layer provides improved physical properties for an increased thickness.

EXAMPLES 8 AND 9

Examples 8 and 9 were carried out in order to compare films having different amounts of polypropylene polymer in the core layer. The films for the Examples 8 and 9 were produced in accordance with the process used for the films of the Examples 3 to 5.

Table 5

| Physical Properties | Example 8 | Example 9 |
|---|---|---|
| % of P-P A in core layer | 50% | 67% |
| Puncture Toughness load (lbs.) | 9.7 | 6.0 |
| Puncture Toughness energy (in.-lbs.) | 13.3 | 6.6 |
| Dart Drop (g.) | 132 | 52 |

From Table 5, it can be seen that increasing the amount of polypropylene polymer in the core layer reduces the impact properties of the film of the invention.

EXAMPLES 10 AND 11

Examples 10 and 11 were carried out in order to compare the physical properties of two films which have the same first outer layers and core layers and different second outer layers. For this purpose, two films were made in accordance with the process of the Examples 3 to 5 with each film having a thickness of about 3.0 mils instead of 1.5 mil and having layer thickness in the ratio of 1:2:3. For each film, the first outer layer was polymer P-E A and the core layer was an equal blend of the polymer P-P B and P-B A. For the Example 10, the second outer layer was polymer P-E A and for the Example 11, the second outer layer was an equal blend of the polymers P-E A and EVA A.

Table 6 shows a comparison between the measured physical properties of the films of the Examples 10 and 11. This shows the superiority of the blend used in Example 11 as a heat sealing layer.

Table 6

| Physical Properties | Example 10 | Example 11 |
|---|---|---|
| Dart Drop (g.) | 315 | 241 |
| Puncture Toughness load (lbs.) | 10.0 | 9.6 |
| Puncture Toughness energy (in.-lbs.) | 12.2 | 9.8 |
| Elmendorf Tear (g.) MD | 1046 | 639 |
| TD | 1024 | 1386 |
| Tensile strength (lbs./in.$^2$) MD | 3300 | 3900 |
| TD | 3600 | 4000 |
| Heat Seal Strength Test (lbs.) | 3.5 | 5.6 |

EXAMPLES 12, 13, 14, AND 15

Examples 12, 13, 14 and 15 were carried out in order to compare the physical property of films having different blends for the core layers. A film having a thickness of 3.0 mils and a ratio of layers of 1:2:3 was produced in accordance with the process of the Examples 3 to 5. The outer layers of each of the films were the polymer P-E A and the core layers were a blend of P-P B and P-B A with the ratio of P-P B:P-B A as shown in Table 7.

Table 7

| Physical Properties | Example 12 | Example 13 | Example 14 | Example 15 |
|---|---|---|---|---|
| P-P B:P-B A | 0:100 | 20:80 | 35:65 | 50:50 |
| Dart Drop (g.) | 346 | 272 | 230 | 315 |
| Puncture Toughness load (lbs.) | 11.1 | 8.6 | 9.1 | 10.0 |
| Puncture Toughness energy (in.-lbs.) | 11.4 | 10.8 | 9.8 | 12.2 |
| Elmendorf Tear (g.) MD | 1202 | 623 | 526 | 1046 |
| TD | 1540 | 1101 | 1093 | 1027 |
| Tensile Strength (lbs./in.$^2$) MD | 3200 | 3400 | 3400 | 3300 |
| TD | 2600 | 2900 | 3200 | 3600 |
| Heat Seal Strength (lbs.) | | 2.9 | | 4.5 |

The film of the Example 12 tended to delaminate during the heat seal strength test so that a core of 100% polybutylene is unacceptable. The film of the Example 13 performed better that the film of the Example 12 during the Heat Seal Strength Test and the films of the Examples 14 and 15 showed some delamination during the Heat Seal Strength Test. Previous tests for comparable films having a thickness of about 1.5 mils showed no delamination.

EXAMPLES 16, 17 AND 18

Examples 16, 17 and 18 were carried out to further compare films having core layers with different blends. Each film having a thickness of 1.5 mil and a ratio of layers of 1:1:1 was produced in accordance with the process of the Examples 3 to 5. The outer layers for the films were polymer P-P B while the core layers were blends of polymers P-P B and P-B A with the ratio of P-P B:P-B A as shown in Table 8.

Table 8

| Physical Properties | Example 16 | Example 17 | Example 18 |
|---|---|---|---|
| P-P B:P-B A | 50:50 | 67:33 | 100:0 |
| Dart Drop (g.) | 84 | 90 | less than 50 |
| Puncture Toughness load (lbs.) | 5.3 | 5.2 | — |
| Puncture Toughness energy (in.-lbs.) | 4.6 | 3.8 | — |
| Elmendorf Tear (g.) MD | 330 | 370 | less than 20 |
| TD | 1090 | 880 | — |
| Tensile strength (lbs./in.$^2$) MD | 4070 | 4300 | — |
| TD | 3100 | 3000 | — |

The films of the Examples 16 and 17 were good whereas the film of the Example 18 was very poor. Thus, a core layer of 100% polypropylene is not satisfactory at all.

EXAMPLES 19 AND 20

Examples 19 and 20 were carried out in order to compare the physical properties of two films having core layers with different polybutylene homopolymers. The films for the Examples 19 and 20 were made in accordance with the process of the film of the Example 15. The film for the Example 19 was similar to the film of the Example 15 and the film for the Example 20 used P-B B for the core layer. The physical properties for the Examples 19 and 20 are shown in Table 9. Each film had a thickness of about 3.0 mils.

Table 9

| Physical Properties | Example 19 | Example 20 |
|---|---|---|
| Polybutylene Homopolymer | P-B A | P-B B |
| Dart Drop (g.) | 315 | 211 |
| Puncture Toughness load (lbs.) | 10.0 | 10.5 |
| Puncture Toughness energy (in.-lbs.) | 12.2 | 12.4 |
| Elmendorf Tear (g.) MD | 1046 | 763 |
| TD | 1027 | 1015 |
| Tensile Strength (lbs./in$^2$) MD | 3300 | 3300 |
| TD | 3600 | 3400 |

The film of the Example 19 exhibits somewhat better physical properties than the film of the Example 20 so that it shows that the lower value of melt flow for the polybutylene is preferable.

EXAMPLES 21, 22, AND 23

Examples 21, 22, and 23 were carried out in order to compare the physical properties of films having different layer ratios. Films for the Examples 21, 22, and 23 were made with outer layers of polymer P-E A and core layers of a blend of equal amounts of polymers P-P B and P-B B. The same process as described for the Examples 3 to 5 was used, but the ratio of the layers for the respective films was as shown in Table 10. The film thickness for each example was about 1.5 mils.

Table 10

| Physical Properties | Example 21 | Example 22 | Example 23 |
|---|---|---|---|
| Ratio of layers | 1:1:1 | 2:1:2 | 3:1:3 |
| Dart Drop (g.) | 88 | 84 | 88 |
| Puncture Toughness load (lbs.) | 5.3 | 5.2 | 5.2 |
| Puncture Toughness energy (in.-lbs.) | 4.6 | 3.8 | 4.0 |
| Elmendorf Tear (g.) MD | 330 | 220 | 210 |
| TD | 1090 | 890 | 910 |
| Tensile Strength (lbs./in.$^2$) MD | 4070 | 3800 | 3500 |
| TD | 3100 | 2800 | 2800 |

The Example 21 had the greatest core thickness and also had the best physical properties.

EXAMPLES 24 AND 25

Examples 24 and 25 were carried out in order to measure the physical properties of two films made in accordance with the Example 19 but with the blowup ratios as shown in Table 10. Each film had a thickness of 3.0 mils.

Table 10

| Physical Properties | Example 24 | Example 25 |
|---|---|---|
| Blow Up Ratio | 3.0 | 4.0 |
| Dart Drop (g.) | 211 | 214 |
| Puncture Toughness load (lbs.) | 10.1 | 10.5 |
| Puncture Toughness energy (in.-lbs.) | 12.1 | 12.4 |
| Elmendorf Tear (g.) MD | 615 | 763 |
| TD | 1316 | 1015 |
| Tensile Strength (lbs./in.$^2$) MD | 3200 | 3300 |
| TD | 3000 | 3400 |

The film of the Example 25 with the higher blowup ratio exhibited somewhat better physical properties and is preferable.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A multilayer film suitable for use in fabricating a trash bag, includes a first outer layer comprising a first extruded heat sealable polyolefin; a second outer layer comprising a second heat extruded sealable polyolefin; and an extruded core layer comprising a blend of a polybutylene homopolymer having a melt flow of from about 0.4 to about 10.0 decigrams per minute, and a polypropylene homopolymer or copolymer having a melt flow of from about 0.5 to about 15.0 decigrams per minute.

2. The multilayer film of claim 1, wherein at least one of said polyolefins comprises polyethylene having a density of from 0.916 to 0.962 gram per cubic centimeter and having a melt flow of from 0.1 to 10.0 decigrams per minute.

3. The multilayer film of claim 2, wherein said polyethylene has a density of from 0.916 to 0.930 gram per cubic centimeter and a melt flow of from 0.1 to 6.0 decigrams per minute.

4. The multilayer film of claim 1, wherein at least one of said polyolefins comprises a copolymer of ethylene ethyl acrylate or ethylene vinyl acetate, said one polyolefin having a comonomer content of from about 1% to about 30% by weight and having a melt flow of from about 0.3 to about 10.0 decigrams per minute.

5. The multilayer film of claim 4, wherein said one polyolefin has a comonomer content of from about 1% to about 20% by weight and a melt flow of from about 0.3 to about 5.0 decigrams per minute.

6. The multilayer film of claim 1, wherein said polypropylene homopolymer or copolymer has a density of from about 0.89 to about 0.91 gram per cubic centimeter.

7. The multilayer film of claim 1, wherein said polybutylene homopolymer has a density of from about 0.90 to about 0.92 gram per cubic centimeter.

8. The multilayer film of claim 1, wherein said blend comprises from about 10% to about 90% by weight of said polybutylene homopolymer and from about 90% to about 10% by weight of said polypropylene homopolymer or copolymer.

9. The multilayer film of claim 1, wherein the weight ratio of said polybutylene homopolymer to said polypropylene homopolymer or copolymer is from about 1:2 to about 2:1.

10. The multilayer film of claim 9, wherein the weight ratio is about 1:1.

11. The multilayer film of claim 1, wherein the thickness of said film is from about 0.5 to about 10 mils.

12. The multilayer film of claim 11, wherein the thickness of said film is about 1.5 mils.

13. The multilayer film of claim 1, wherein the thickness of said film is about 3.0 mils.

14. A multilayer film of claim 1, consisting essentially of said first outer layer, said second outer layer, and said core layer.

15. A bag fabricated from the multilayer film of claim 1.

16. A method for producing a multilayer film, comprising the steps of supplying to three separate extruders respectively first and second heat sealable polyolefins, and a blend of polybutylene homopolymer, and a polypropylene homopolymer or copolymer with each extruder feeding a separate channel of a multilayer die and extruding through a single die gap a multilayer film including first and second outer layers of said first and second polyolefins, respectively, and a core layer including said blend.

17. The method of claim 16, wherein at least one of said polyolefins comprises polyethylene having a density of from 0.916 to 0.962 gram per cubic centimeter and having a melt flow of from 0.1 to 10.0 decigrams per minute.

18. The method of claim 17, wherein said polyethylene has a density of from 0.916 to 0.930 gram per cubic centimeter and a melt flow of from 0.1 to 6.0 decigrams per minute.

19. The method of claim 16, wherein at least one of said polyolefins comprises a copolymer of ethylene ethyl acrylate or ethylene vinyl acetate, said copolymer having a comonomer content of from about 1% to about 30% by weight and having a melt flow of from about 0.3 to about 10.0 decigrams per minute.

20. The method of claim 19, wherein said copolymer has a comonomer content of from about 1% to about 20% by weight and a melt flow of from about 0.3 to about 5.0 decigrams per minute.

21. The method of claim 16, wherein said polypropylene homopolymer or copolymer has a density of from about 0.89 to about 0.91 gram per cubic centimeter and a melt flow of from about 0.5 to about 15.0 decigrams per minute.

22. The method of claim 16, wherein said polybutylene homopolymer has a density of from about 0.90 to about 0.92 gram per cubic centimeter and a melt flow of from about 0.4 to about 10.0 decigrams per minute.

23. The method of claim 16, wherein said blend comprises from about 10% to about 90% by weight of said polybutylene homopolymer and from about 90% to about 10% by weight of said polypropylene homopolymer or copolymer.

24. The method of claim 16, wherein the weight ratio of said polybutylene homopolymer to said polypropylene homopolymer or copolymer is from about 1:2 to about 2:1.

25. The method of claim 24, wherein the weight ratio is about 1:1.

26. The method of claim 16, wherein the thickness of said film is from about 0.5 to about 10 mils.

27. The method of claim 16, wherein the thickness of said film is about 1.5 mils.

28. The method of claim 16, wherein the thickness of said film is about 3.0 mils.

29. The method of claim 16, further comprising the step of fabricating a bag from a portion of said film.

30. The method of claim 29, wherein said bag is fabricated by heat sealing.

* * * * *